(12) United States Patent
Hu (10) Patent No.: US 9,154,330 B2
(45) Date of Patent: Oct. 6, 2015

(54) METHOD AND DEVICE OF LINK AGGREGATION AND METHOD AND SYSTEM FOR TRANSCEIVING MAC FRAMES

(75) Inventor: Haitao Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 829 days.

(21) Appl. No.: 12/486,005

(22) Filed: Jun. 17, 2009

(65) Prior Publication Data

US 2009/0252170 A1 Oct. 8, 2009

Related U.S. Application Data

(63) Continuation of application No. PCT/CN2007/071304, filed on Dec. 21, 2007.

(30) Foreign Application Priority Data

Dec. 25, 2006 (CN) .......................... 2006 1 0161781

(51) Int. Cl.
*H04L 12/46* (2006.01)
*H04L 12/931* (2013.01)
(Continued)

(52) U.S. Cl.
CPC ........ *H04L 12/4675* (2013.01); *H04L 12/4641* (2013.01); *H04L 12/4679* (2013.01);
(Continued)

(58) Field of Classification Search
CPC ............ H04L 12/4675; H04L 12/4679; H04L 45/245; H04L 12/4691; H04L 12/4641; H04L 49/354; H04L 47/20; H04L 49/70
See application file for complete search history.

(56) References Cited

U.S. PATENT DOCUMENTS 7,345,991 B1 * 3/2008 Shabtay et al. ................ 370/221
7,624,187 B1 * 11/2009 Gilmartin et al. ............. 709/229
(Continued)

FOREIGN PATENT DOCUMENTS

CN 1798080 A 7/2006
CN 1866910 A 11/2006
(Continued)

OTHER PUBLICATIONS

1st Office Action in corresponding Chinese Application No. 200610161781.8 (May 9, 2008).
(Continued)

*Primary Examiner* — Andrew Chriss
*Assistant Examiner* — Salvador E Rivas
(74) *Attorney, Agent, or Firm* — Leydig, Voit & Mayer, Ltd.

(57) ABSTRACT

A method and a device of link aggregation and a method and a system for transceiving MAC frames are provided. The method includes: transmitting, by systems at two ends of a link, information of virtual local area networks (VLANs) of a port in a local end system to an opposite end system through message exchange; and determining, by the systems at the two ends of the link, the VLAN of the link respectively according to the received information of the VLAN of the port in the opposite end system and the information of the VLAN of the port in the local end system, and performing link aggregation according to the VLAN of the link. Thus, the networking flexibility is improved, the convenience of network design and network maintenance and management is improved, and the MAC frames having VLAN identifiers can be distributed to the corresponding VLAN links rapidly, accurately, and conveniently.

6 Claims, 5 Drawing Sheets

(51) Int. Cl.
*H04L 12/709* (2013.01)
*H04L 12/813* (2013.01)

(52) U.S. Cl.
CPC .......... *H04L12/4691* (2013.01); *H04L 45/245* (2013.01); *H04L 49/354* (2013.01); *H04L 47/20* (2013.01); *H04L 49/70* (2013.01); *Y02B 60/33* (2013.01)

(56) References Cited

U.S. PATENT DOCUMENTS

| | | | |
|---|---|---|---|
| 2002/0027906 A1* | 3/2002 | Athreya et al. | 370/386 |
| 2002/0105949 A1* | 8/2002 | Shinomiya | 370/386 |
| 2003/0206548 A1* | 11/2003 | Bannai et al. | 370/389 |
| 2006/0092860 A1* | 5/2006 | Higashitaniguchi et al. | 370/255 |
| 2007/0036165 A1* | 2/2007 | Rose et al. | 370/401 |
| 2008/0205296 A1 | 8/2008 | Zhang et al. | |
| 2008/0215910 A1* | 9/2008 | Gabriel et al. | 714/4 |

FOREIGN PATENT DOCUMENTS

| | | |
|---|---|---|
| CN | 1878112 A | 12/2006 |
| CN | 1996925 A | 7/2007 |
| CN | 101035050 A | 9/2007 |
| CN | 100512194 C | 7/2009 |
| WO | WO 02/30044 A2 | 4/2002 |
| WO | WO 2005/018174 A1 | 2/2005 |

OTHER PUBLICATIONS $2^{nd}$ Office Action in corresponding Chinese Application No. 200610161781.8 (Nov. 28, 2008).
$1^{st}$ Office Action in corresponding European Application No. 07846130.8 (Jan. 19, 2011).
Written Opinion of the International Searching Authority in corresponding PCT Application No. PCT/CN2007/071304 (Apr. 3, 2008).
Jeffree et al., "P802.3ad/D3.1—Aggregation of Multiple Link Segments," IEEE Draft P802.3ad/D3.1—Supplement to Information Technology—Local and Metropolitan Area Networks—Part 3: Carrier Sense Multiple Access with Collision Detection (CSMA/CD) Access Method & Physical Layer Specifications, Jan. 24, 2000, Institute of Electrical and Electronics Engineers, New York, New York.
"VLAN," Railway Signalling & Communication, Mar. 2006, vol. 42, No. 3, China Academic Journal Electronic Publishing House, Beijing, China.
$2_{nd}$ Office Action in corresponding Chinese Patent Application No. 07 846 130.8 (May 17, 2013).
$2^{nd}$ Office Action in corresponding European Patent Application No. 07 846 130.8 (May 17, 2013).

* cited by examiner

METHOD AND DEVICE OF LINK AGGREGATION AND METHOD AND SYSTEM FOR TRANSCEIVING MAC FRAMES

CROSS-REFERENCE TO RELATED APPLICATIONS

This application is a continuation of International Patent Application No. PCT/CN2007/071304, filed Dec. 21, 2007, which claims priority to Chinese Patent Application No. 200610161781.8, filed Dec. 25, 2006, both of which are hereby incorporated by reference in their entirety.

FIELD OF THE TECHNOLOGY

The present invention relates to the field of network communication, and more particularly to a method and device of link aggregation, and to a method and system for transceiving Media Access Control (MAC) frames.

BACKGROUND

Link aggregation technology is also called link convergence, link bundling, or trunking. The link aggregation technology means aggregation of a plurality of independent physical links into one logic link. After the link aggregation, for upper layer MAC clients, the physical links seem to be only one logic link. The link aggregation can increase the bandwidth between network elements, and enhance the reliability and flexibility of connection between the network elements.

Currently, the link aggregation is implemented as follows.

Systems at the two ends of a link exchange link aggregation configuration information by exchanging Link Aggregation Control Protocol Data Unit (LACPDU) packets. Generally, an LACPDU packet has a destination MAC address of 01-80-c2-00-00-02, and has a source MAC address which is an MAC address of a port for sending the LACPDU packet. The LACPDU packet carries identifier information and status information. The identifier information is used to identify units participating in link aggregation. An LACP entity assigns an identifier for each unit participating in link aggregation. Here, the "units" include systems, aggregators, ports, aggregation capability of ports, and link aggregation groups (LAGs) which are participating in link aggregation. Except the aggregation capability of ports that adopts management key values and operation key values as identifiers, identifiers of other units are basically MAC address-based. For the units in the same layer, the identifier information should be unique and be managed globally.

After receiving the LACPDU packet, the LACP entities at the two end systems of the link determine the ports which are allowed to aggregate together according to the "identifiers of aggregation capability of ports" carried in the LACPDU packet, and create or maintain a corresponding LAG. For example, if the LACP entities determine that the "identifiers of aggregation capability of ports" carried in the LACPDU packet are the same as those of an existing LAG, the LACP entities add the link corresponding to the ports to the existing LAG. Furthermore, for example, if the LACP entities determine that the "identifiers of aggregation capability of ports" carried in the LACPDU packet are different from those of all existing LAGs, the LACP entities create a new LAG. After the new LAG has been created, the LACP entities at the two ends of the link need to reach an agreement on the new LAG, and then perform MAC frame transmission by using the newly created LAG.

At present, the MAC frame transmission based on link aggregation is as follows.

A frame distributor distributes MAC frames to the corresponding links in the LAG according to destination addresses (DAs), source addresses (SAs), MAC service data units (M_SDUs), and service classes (service_class) of the MAC frames, so as to perform MAC frame transmission.

During the implementation of the present invention, the inventors find that, the current link aggregation process fails to consider the Virtual Local Area Network (VLAN), and furthermore, the frame distributor also fails to consider the VLAN during the distribution of MAC frames. As a result, the MAC frames cannot be distributed according to VLAN identifiers. If the ports of physical links in the LAG have been classified on the basis of the VLAN, and the VLANs of the ports of the different physical links in the LAG are different, the MAC frames having VLAN identifiers may be distributed to other VLAN links. In order to solve the problem that the MAC frames having VLAN identifiers may be distributed to other VLAN links, it is necessary to ensure that the VLANs of the ports of each link participating in the aggregation have the same configuration during the link aggregation, which, however, influences flexibility of the networking application, increases difficulty of the network design and network maintenance and management, and even causes a case where the link aggregation may only be implemented in a manual manner.

SUMMARY

Various embodiments of the present invention provide a method and a device of link aggregation and a method and a system for transceiving MAC frames, so that MAC frames having VLAN identifiers are distributed to corresponding VLAN links rapidly, accurately, and conveniently, which increases networking flexibility, and improves the convenience in network design and network maintenance and management.

An embodiment of the present invention provides a method of link aggregation, which aggregates links into an LAG and performs MAC frame transmission by using the LAG. The method includes: (1) transmitting, by systems at two ends of a link, information of VLANs of a port in a local end system to an opposite end system through message exchange; and (2) determining, by the systems at the two ends of the link, the VLAN of the link respectively according to the received information of the VLAN of the port in the opposite end system and the information of the VLAN of the port in the local end system, and performing link aggregation according to the VLAN of the link.

An embodiment of the present invention provides a device of link aggregation, which is disposed in systems at two ends of a link. The device includes: (1) a VLAN information storage module, adapted to store information of VLANs of the ports of the systems at the two ends of the link; (2) a transceiver module, adapted to transmit the information of the VLANs of the ports of a local end system stored in the VLAN information storage module to an opposite end system, receive information of the VLAN of the port transmitted from the opposite end system, and store the information of the VLAN of the port transmitted from the opposite end system into the VLAN information storage module; and (3) a link aggregation module, adapted to determine the VLAN of the link according to the information of the VLANs of the ports of the systems at the two ends of the link stored in the VLAN information storage module, and perform link aggregation according to the VLAN of the link.

An embodiment of the present invention further provides a method for transceiving MAC frames transmitted through an LAG. The method includes: (1) obtaining, by a transmitting end, VLAN information of the MAC frames and VLAN information of links in the LAG; (2) selecting, by the transmitting end, a link for sending the MAC frames from links having the same VLAN as the MAC frames, and transmitting the MAC frames to a receiving end through the selected link; and (3) transmitting, by the receiving end, the received MAC frames to a MAC client.

An embodiment of the present invention further provides a system for transceiving MAC frames, which transmits an MAC frame through an LAG. The system includes: (1) a transmitting device, adapted to obtain VLAN information of the MAC frames and VLAN information of links in the LAG, select a link for sending the MAC frames from links having the same VLAN as the MAC frames, and transmit the MAC frames to a receiving end through the selected link; and (2) a receiving device, adapted to transmit the received MAC frames to a MAC client.

In view of the above description about the technical solutions, the embodiments of the present invention perform the link aggregation according to the VLANs of links during the link aggregation, thereby enhancing networking flexibility and improving convenience of network design and maintenance and management. Further, by considering the VLAN information of the MAC frames and the VLAN information of the links during distribution of the MAC frames, it can be effectively ensured that the MAC frames of a certain VLAN may only be distributed to the link of the VLAN so that the MAC frames having the VLAN identifier can be distributed to the corresponding VLAN link rapidly, accurately, and conveniently.

BRIEF DESCRIPTION OF THE DRAWINGS

The present invention becomes more fully understood by referring to the drawings given herein below for illustration only, and thus are not limitative to the present invention, and among which.

DETAILED DESCRIPTION

VLAN technology is an Ethernet technology that is widely applied at present. A VLAN can isolate broadcast domains in the network, increase confidentiality of users, ensure the network security, and enhance the networking flexibility. Currently, the method of classifying VLANs may be based on ports, MAC addresses, network layer protocols, IP addresses, application programs, and policies. The most common method to classify VLANs is based on ports, that is, one port belongs to a plurality of VLANs.

In embodiments of the present invention, the VLAN information of the links is taken into consideration in link aggregation. The VLAN information of a link can be determined based on the VLANs allocated to the ports at the two ends of the link, and the VLANs allocated to the ports may also be called VLANs of the ports. The technical solutions for link aggregation in the embodiments of the present invention may also be called technical solutions for link aggregation based on the VLANs of the ports. The method of link aggregation according to the embodiments of the present invention will be described as follows.

At first, systems at two ends of a link exchange information of the VLANs of the port of the link, that is, each of the systems at the two ends of the link needs to transmit the information of the VLANs of the port of a local end system of the link to an opposite end system. The embodiments of the present invention do not limit the time of transmitting the information of the VLANs of the port by the systems at the two ends of the link. For example, the systems at the two ends of the link may transmit the information of the VLANs of the port periodically, transmit the information of the VLANs of the port when the information of the VLANs of the port in the local end system changes, or transmit the information of the VLANs of the port when the link is created. The systems at the two ends of the link both can transmit the information of the VLANs of the port to the opposite end system at one time or at a plurality of times. The systems at the two ends of the link can store the information of the VLAN of each port in various modes, such as a VLAN list. After receiving the information of the VLANs of the port transmitted from the opposite end system, the local end system needs to update the VLAN list in time. The information of the VLANs of the port indicates the information of the allocation of the VLAN at a certain port. The information of the VLANs of the port may be port identity information and the VLAN information of the port, and may also be port identity information, the VLAN information of the port, and the information of the number of VLANs. The embodiments of the present invention do not limit the specific forms of the information of the VLANs of the port. The systems at the two ends of the link can transmit the information of the VLANs of the port through packets of a plurality of protocols, such as an LACP packet, a Generic Attribute Registration Protocol (GARP) packet, and a custom protocol packet. The embodiments of the present invention do not limit the protocol for transmitting the information of the VLANs of the port. The embodiments of the present invention can adopt the method of adding fields into an existing packet to carry the information of the VLANs of the port, or adopt the original fields in an existing packet to transmit the information of the VLANs of the port. The embodiments of the present invention do not limit the specific forms of the information of the VLANs of the port in the packet.

When the system at one end needs to transmit the information of the VLANs of its own port to the opposite end system, the system may also transmit the information of the VLANs of the port in the opposite end system stored therein to the opposite end system together. Thus, the information of the VLANs of the port stored in the systems at the two ends keeps the same to the maximum extent. For example, the systems at the two ends of the link are set to a system 1 and a system 2 respectively. The system 1 transmits the information of the VLANs of the port of the link in the system 1 and the information of the VLANs of the port of the link in the system 2 stored therein to the system 2, the system 2 updates the information of the VLANs of the port of the system 1 stored therein according to the information of the VLANs of the port of the link in the system 1 transmitted by the system 1, and the system 2 can compare the information of the VLANs of the port of the link in the system 2 transmitted by the system 1 with the information of the VLANs of the port of the link in this system stored in the system 2. When it is determined that the two are different, the system 2 decides to transmit the information of the VLANs of the port of the link in the system 2 stored therein to the system 1, so as to rapidly synchronize the information of the VLANs of the port stored in the systems at the two ends. When it is determined that the two are the same, the system 2 may not transmit the information of the VLANs of the port of the link in this system temporarily, so as to avoid unnecessary information transmission and save network transmission resources.

After the exchange of the information of the VLANs of the port, the systems at the two ends of the link can both acquire allocation of the VLANs of the link of the port in the local end system and allocation of the VLANs of the link of the port in the opposite end system. The systems at the two ends of the link may determine the VLAN information of the link according to the allocation of the VLANs of the ports. For example, the systems at the two ends of the link respectively intersect the VLAN information of the ports at the two ends of the link, and the VLAN information in the intersection set is the VLAN information of the link. Thus, the systems at the two ends of the link may perform link aggregation according to the VLAN information of each link. After the VLAN information of the link is obtained, during the link aggregation performed by the systems at the two ends of the link, the realization process substantially the same as the conventional link aggregation technology may be adopted, which is not described in detail herein.

After the link aggregation, when all the links in the LAG are faulty, the systems at the two ends of the link both need to output connection fault information of the LAG. The systems at the two ends of the link may adopt a periodic checking method to determine the link status of each link in the LAG, and may also check the VLAN information of a physical link when a fault occurs on the physical link. Then, the link status of each link in the corresponding LAG is checked according to the VLAN information of the physical link. The embodiments of the present invention do not limit the specific method of checking whether all the links in the LAG are faulty.

When all the links in the LAG are faulty, if a link or some links in the LAG return to the normal status, the systems at the two ends of the link both need to output connection recovery information of the LAG. The systems at the two ends of the link may adopt the periodic checking method to determine the link status of each link in the LAG, and check the VLAN information of the physical link when the physical link returns to the normal status. Then, the link status of each link in the corresponding LAG is checked according to the VLAN information of the physical link. The embodiments of the present invention do not limit the specific method of checking whether all the links in the LAG return to the normal status.

The LACP is taken as an example to describe the method of link aggregation in detail according to an embodiment of the present invention.

In this embodiment, the systems at the two ends of the link transmit the information of the VLANs of the port by adding VLAN identifiers of the port into an LACPDU packet, so that the systems at the two ends of the link can import the VLAN information of the link when performing the link aggregation.

The systems at the two ends of the link respectively create a VLAN list for the port of each physical link. That is, the systems at the two ends of the physical link both record the VLAN lists of the ports at the two ends of the physical link. When a port of the physical link are added into a certain VLAN, records are added into the VLAN list of the port in the systems at the two ends so as to record the information of the VLAN into which the port is newly added. When the port is deleted from a certain VLAN, the corresponding VLAN is deleted from the VLAN list of the port.

The systems at the two ends of the link both need to modify the VLAN list according to the information of the VLANs of the port transmitted from the opposite end system. When the systems at the two ends of the link transmit the information of the VLANs of the port by using the LACPDU packet, the LACPDU packet may be expanded to include the information of the VLANs of the port, as shown in FIG. 1.

Figure 1:
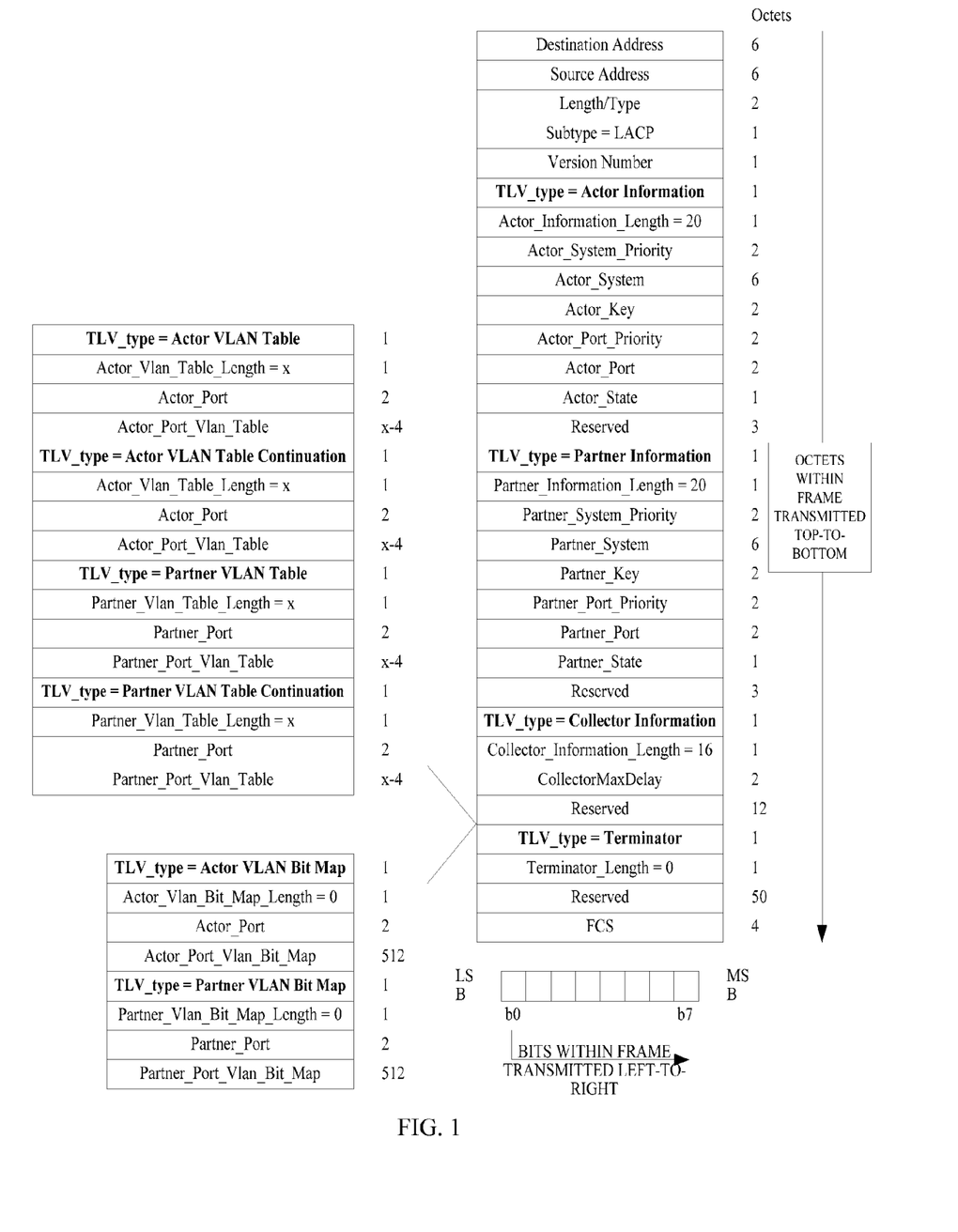
FIG. 1 is a schematic structural view 1 of an LACPDU packet according to an embodiment of the present invention.

In FIG. 1, TLV_type=Actor VLAN Table is adapted to indicate that the TLV field is the VLAN list information of Actor (this system), and the identifier may be 0x04. Actor refers to the identifier of the system transmitting the LACPDU packet. In consideration of the fact that the field length of the LACPDU packet cannot be longer than 255 bytes, one VLAN Table possibly may not accommodate all VLANIDs. Therefore, TLV_type=Actor VLAN Table Continuation may be adapted to indicate that the TLV field is an addition to the VLAN Table of Actor, and the identifier may be 0x05.

Actor_Vlan_Table_Length=x is adapted to identify the length of the TLV field, which may be calculated based on bytes (one byte=8 bits). x represents that the length of the TLV field may be changed. This length is changed with the number of VLAN IDs in the VLAN list, and each VLAN ID may occupy two bytes.

Actor_Port is used to identify a port number corresponding to the VLAN list, and the port number may be an unsigned integer assigned by Actor.

Actor_Port_Vlan_Table includes a VLAN ID list containing all VLANs at the Actor Port.

TLV_type=Partner VLAN Table is used to indicate that the TLV field is the VLAN list information of a Partner (the opposite end system). The identifier may be 0x06. The Partner refers to the system receiving the LACPDU packet. TLV_type=Partner VLAN Table Continuation is adapted to indicate that the TLV field is an addition to the VLAN list of the Partner, and the identifier may be 0x07.

Partner_Vlan_Table_Length=x is used to identify the length of the TLV field, and the length of the TLV field may be calculated based on bytes.

Partner_Port is used to identify the port number corresponding to the VLAN list. The port number may be an unsigned integer assigned by the Partner.

Partner—Port—Vlan_Table includes a VLAN ID list containing all VLANs at the Partner Port.

TLV_type=Actor VLAN Bit Map is used to indicate that the TLV field is VLAN configuration bitmap information of Actor. The identifier may be 0x06.

Actor_Vlan_Bit Map_Length=0 is used to indicate that the length of the TLV field is fixed and may be 516 bytes.

Actor_Port_Vlan_Bit_Map is a bitmap representation method of all VLANs at the Actor port. If the VLAN ID is expressed with 12 bits, the length of Actor_Port_Vlan_Bit_Map may be in a range of 0-4095 bits. If each VLAN ID is expressed with one bit in this bitmap representation method, the bits corresponding to 4096 VLAN IDs may be accommodated in 512 bytes.

TLV_type=Partner VLAN Bit Map is used to indicate that TLV field is the VLAN configuration bitmap information of the Partner, and the identifier may be 0x07.

Partner_Vlan Bit Map_Length=0 is used to indicate that the length of the TLV field is fixed and may be 516 bytes.

Partner—Port—Vlan_Bit_Map is a bitmap representation method of all VLANs at the Partner port.

FIG. 1 defines two methods for expressing VLAN identifiers. Considering the number of VLANs allocated at one port, if only the VLAN ID list is adopted to denote the VLANs allocated at the port, the field length may possibly be insufficient; if only the VLAN bitmap is adopted to denote the VLANs allocated at the port, the LACPDU packet is too long. As the two methods are both adopted to denote the VLAN identifiers, the LACPDU packet may be set flexibly according to the number of VLANs allocated at the port. If a small number of VLANs are allocated at the port, the VLAN ID list method may be adopted to transmit the information of the VLAN of the port, thereby efficiently reducing the length of the LACPDU packet. Furthermore, if a large number of VLANs are allocated at the port, the VLAN bitmap method may be adopted to transmit the information of the VLANs of the port, thereby avoiding the problem that the LACPDU packet needs to be transmitted for many times.

Figure 2:
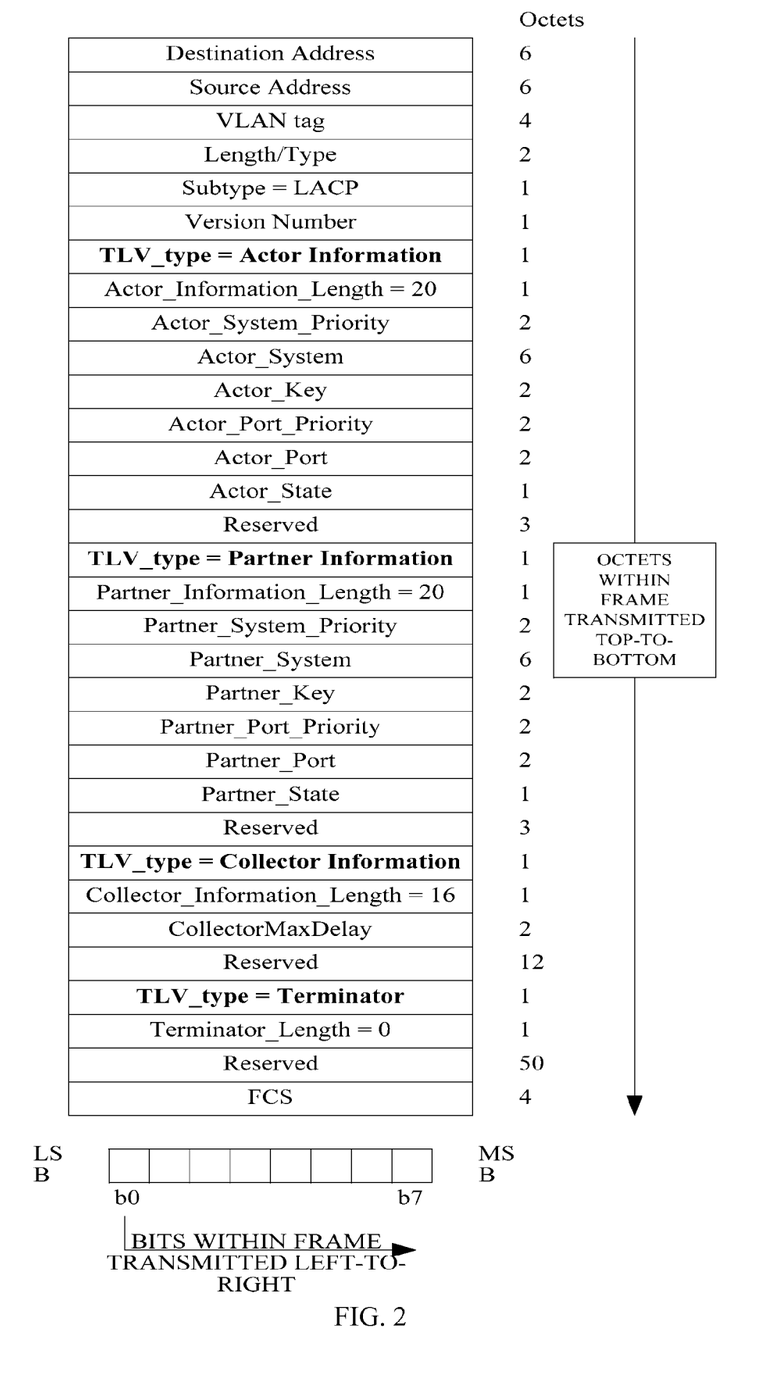
FIG. 2 is a schematic structural view 2 of an LACPDU packet according to an embodiment of the present invention.

According to an embodiment of the present invention, the LACPDU packet may be further extended through other expansion methods, for example, by using the LACPDU packet shown in FIG. 2 to transmit the information of the VLANs of the port.

In FIG. 2, a VLAN tag field is added after a source address (SA) field of the LACPDU packet to identify the VLAN information of the port. The VLAN tag field conforms to the IEEE 802.1q standard. More than one VLAN can be allocated at the port, but the information of only one VLAN of the port can be transmitted each time if the LACPDU packet in FIG. 2 is used. Therefore, the LACPDU packet carrying the VLAN tag needs to be transmitted many times according to the number of VLANs of the port, so as to transmit all the VLANs of the port to the opposite end system.

Except for the method of transmitting the information of the VLANs of the port by using the LACPDU packet, an embodiment of the present invention may further adopt other standard protocol packets or non-standard protocol packets to transmit the information of the VLANs of the port. For example, a GARP VLAN Registration Protocol (GVRP) packet may be adopted. The GVRP is a specific application of GARP, and GARP can perform information distribution, information dissemination, and information registration between network equipments within the network. Herein, the information may be, for example, VLAN information and multicast addresses. According to the GVRP, the VLANs in the whole network are united to reduce the workload of manually configuring VLANs so as to realize dynamic configuration of most of VLANs in the network, that is, the GVRP can realize operation such as dynamic registration and deregistration of VLANs. Furthermore, the VLAN attributes in the GVRP are operated based on ports, and only the port receiving the packet can perform operation of the VLAN attributes. The embodiment of the present invention can make full use of the GVRP packet exchanged in the network, that is, the systems at the two ends of the link obtain the information of the VLANs of the port through the GVRP packet, and the specific implementation process is not described in detail here.

After obtaining the information of the VLANs of the ports at the two ends of the link through the LACPDU packet, the systems at the two ends of the link determine the VLAN information of the link according to the information of the VLANs of the ports at the two ends of the link, that is, calculate the VLANs of the link. The calculation method may be: intersecting the VLAN information of the ports at the two ends of the link, and determining the VLAN information in the intersection set as the VLANs of the link. The systems at the two ends of the link should determine the VLANs of the link when the link is created. The systems at the two ends of the link should further perform the above calculation after the VLAN information of any port at the two ends of the link changes so as to re-determine the VLANs of the link. That is, if the VLAN configuration of the port in the local end system changes, the systems at the two ends of the link should not only update the VLAN list of the local end system in time and transmit the LACPDU packet carrying the information of the VLANs of the port in time, but also should re-calculate the VLANs of the link. In the meantime, after receiving the LACPDU packet, the opposite end system also needs to update the VLAN list in time, and calculate the VLANs of the link again.

The technical solution of determining the VLAN of the link can automatically realize configurations of VLANs of the links participating in the link aggregation, so as to avoid the limitation that the configurations of the VLANs of the links participating in the link aggregation need to be the same.

After determining the VLAN of the link, the systems at the two ends can perform link aggregation according to the VLAN of the link. The specific implementation principle of the link aggregation is substantially the same as that of the link aggregation in the conventional technology, and will not be described in detail here. The embodiments of the present invention achieve link aggregation between the systems allocating VLANs based on ports, and enhance the convenience of network design, management, and maintenance.

After performing the link aggregation, if a physical link is faulty, the systems at the two ends of the link should not only perform processes and operation according to the conventional method, but also should search the LAG of the physical link in the local end system and search for other physical links having the same VLAN as the faulty physical link in the LAG. If the found physical links are all faulty, the systems at the two ends of the link may generate an alarm and output information indicating that the LAG is faulty, thereby preventing the faults of the physical link from influencing the VLAN connectivity. Certainly, the systems at the two ends of the link may also output the corresponding alarm information when the number of the physical links in the normal status in the LAG is lower than a predetermined value. After the LAG has faults, if a physical link returns to the normal status, the systems at the two ends of the link should not only perform processes and operation according to the conventional method, but also should search for the LAG of the physical link in the local end system and then output information indicating that the LAG returns to the normal status. That is, after a physical link returns to the normal status, the systems at the two ends of the link should search for the LAG of the physical link in the local end system and then search for the link status of other links having the same VLAN as the physical link returning to the normal status in the LAG. If the link status of other links is all faulty, the information indicating that the LAG returns to the normal status is output; and if the link status of other links is not all faulty, the information indicating that the LAG returns to normal is not output.

The device of link aggregation according to an embodiment of the present invention is described as follows.

The device of link aggregation according to the embodiment of the present invention is disposed in the systems at the two ends of the link, that is, the device of link aggregation is respectively disposed in the systems at the two ends of the link. The device of link aggregation is provided with a VLAN information storage module, a transceiver module, and a link aggregation module.

The VLAN information storage module is mainly adapted to store information of VLANs of ports of systems at two ends of a link. The information of the VLANs of the ports may be stored in the VLAN information storage module in the form of a VLAN list. The details of the information of the VLANs of the ports are the same as those described in the previous embodiment.

The transceiver module is mainly adapted to transmit the information of the VLANs of the port in the local end system stored in the VLAN information storage module to the opposite end system, receive the information of the VLAN of the port transmitted from the opposite end system, and store the information of the VLAN of the port transmitted from the opposite end system in the VLAN information storage module. The transceiver module may transmit the information of the VLANs of the port periodically or when the information of the VLANs of the port changes. The transceiver module may use an LACPDU packet, a GVRP packet, or packets based on other protocols to transmit the information of the VLANs of the port. The transceiver module may transmit the information of the VLANs of the port to the opposite end system in one time, or transmit the information of the VLAN of the port to the opposite end system at a plurality of times. The detailed method has been described in the previous embodiment.

The link aggregation module is mainly adapted to determine the VLAN of the link according to the information of the VLANs of the ports of the systems at the two ends of the link stored in the VLAN information storage module. For example, the method for determining the VLAN of the link is as follows: intersect the VLAN information of the two ends of the link, and determine the information in the intersection set as the VLAN information of the link. Then, the link aggregation module performs the link aggregation according to the VLAN information of the link. The details have been described in the previous embodiment.

The method for transceiving MAC frames according to an embodiment of the present invention is described in detail in the following. In the embodiment of the present invention, when the MAC frames are transmitted, the VLAN information of MAC and the VLAN information of the links in the LAG are considered. Here, the LAG may perform the link aggregation by adopting the conventional technology, or perform the link aggregation based on the VLANs of the port described in the previous embodiment. The process of transceiving MAC frames is described as follows.

A transmitting end receives MAC frames transmitted by an MAC client and obtains the VLAN information from the MAC frames. The transmitting end searches for the LAG corresponding to the MAC client and obtains the VLAN information of the link in the corresponding LAG. The transmitting end searches for and selects the links having the same VLAN as the MAC frames according to the VLAN information of the links, and selects the link for sending MAC frames from the links having the same VLAN as the MAC frames. That is, the transmitting end needs to ensure that the MAC frames in one VLAN may only be distributed to the links of this VLAN. Then, the transmitting end transmits the MAC frames to a receiving end through the selected link.

The receiving end receives the MAC frames transmitted by the transmitting end, that is, the receiving end receives the MAC frames from the links of the LAG, and transmits the MAC frames to the MAC client corresponding to the LAG.

At the transmitting end, one LAG may be corresponding to an MAC client or a plurality of MAC clients; and at the receiving end, one LAG may also be corresponding to an MAC client or a plurality of MAC clients. If one LAG corresponds to an MAC client, the VLAN identifiers in the MAC frames are not used for distinguishing the MAC client.

In the above description, according to the actual requirements for sending the MAC frames, the transmitting end obtains a destination address (DA), a source address (SA), an MAC service data unit (M_SDU), and a service class (service_class) from the MAC frames. As such, the transmitting end may distribute the MAC frames to the links having the same VLAN as the MAC frames according to the DA, the SA, the VLAN information, the M_SDU, and the service_class through a predetermined frame distribution algorithm so as to transmit the MAC frames to the receiving end through a correct VLAN link.

According to the embodiments of the present invention, the frame distributor is not limited to adopting the predetermined frame distribution algorithm. The key points of the embodiments of the present invention are as follows: the frame distributor can acquire the VLAN identifiers of the MAC frames and the VLANs of each link, and furthermore, the VLAN identifiers of the MAC frames and the VLANs of each link should serve as parameters of the predetermined frame distribution algorithm, so that the VLAN identifiers of the MAC frames and the VLANs of each link influence the calculation results of the predetermined frame distribution algorithm, that is, influence the links to which the MAC frames are distributed. Thus, it is ensured that the MAC frames of a certain VLAN can only be distributed to the link of the VLAN.

Figure 3:
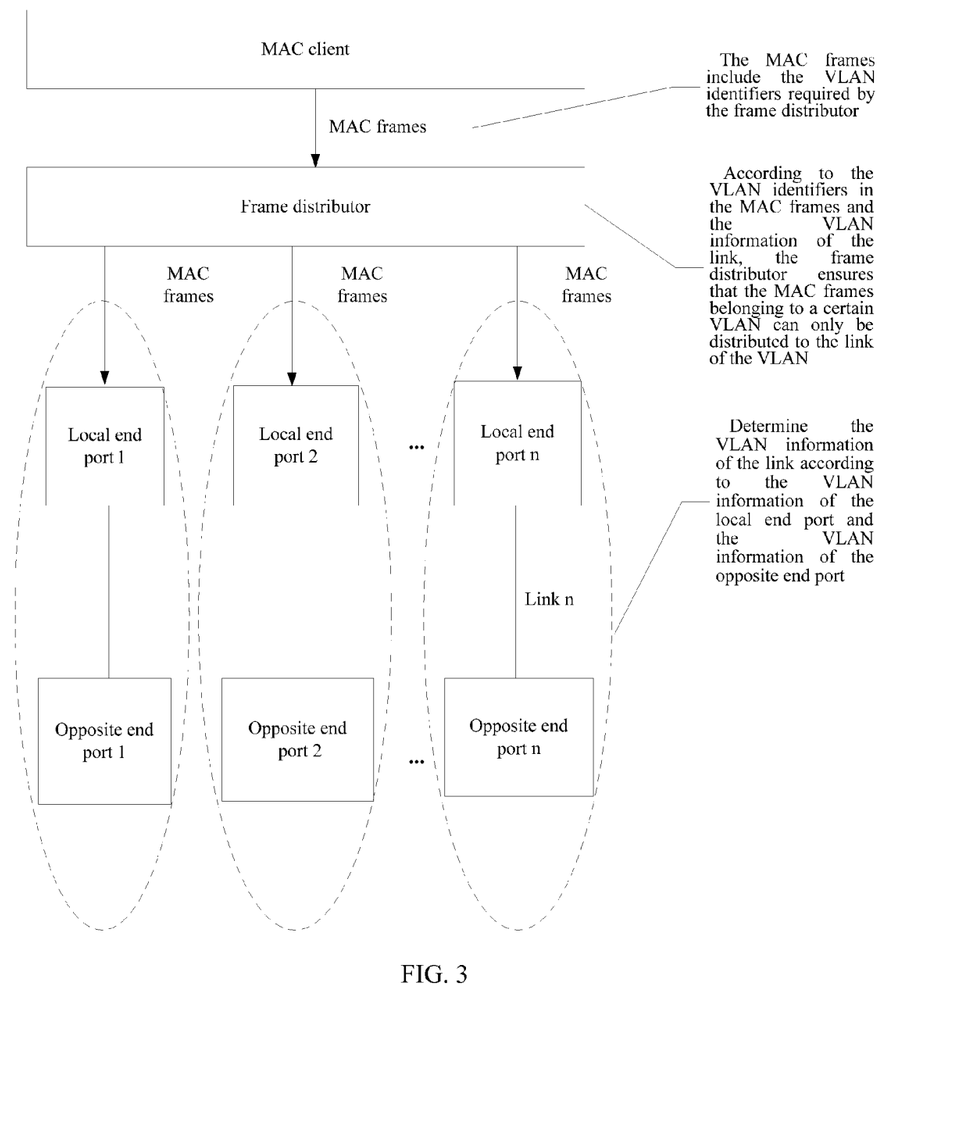
FIG. 3 is a schematic view 1 of MAC frame distribution according to an embodiment of the present invention.

When one LAG corresponds to one MAC client, the embodiments of the present invention can set a frame distributor and a frame collector in the systems at the two ends of the link, as shown in FIG. 3. After receiving the MAC frames transmitted by the MAC client, the transmitting end transmits the MAC frames to the frame distributor. The frame distributor parses the received MAC frames so as to obtain information such as the DA, SA, VLAN information, M_SDU, and service_class from the MAC frames. Then, the frame distributor uses the predetermined frame distribution algorithm to select a link from the links having the same VLAN as the MAC frames, and transmit the MAC frames to the selected link so as to transmit the MAC frames to the receiving end. The frame collector of the receiving end receives the MAC frames on the links of the LAG, and transmits the received MAC frames to the MAC client.

Figure 4:
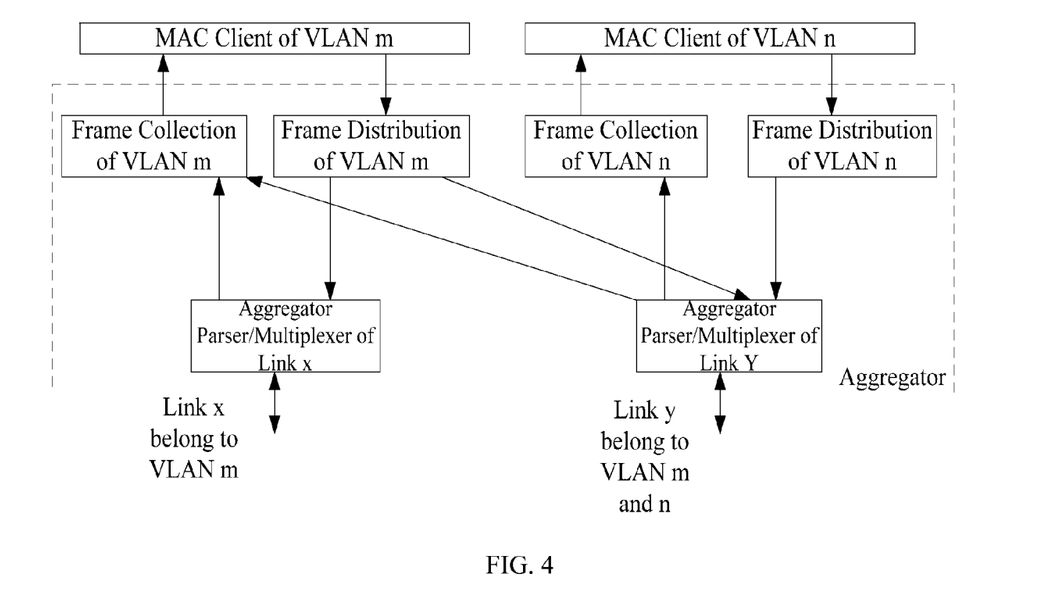
FIG. 4 is a schematic view 1 of MAC frame distribution according to an embodiment of the present invention.

When one LAG corresponds to a plurality of MAC clients, the VLAN identifiers in the MAC frames are adapted to distinguish the MAC clients. The embodiments of the present invention may set a plurality of frame distributors and a plurality of frame collectors in the systems at the two ends of the link respectively, as shown in FIG. 4. In one LAG, the LAG provides a dedicated frame distributor and a dedicated frame collector corresponding to each MAC client. That is, in the LAG, the number of frame distributors and the number of frame collectors may be the same as the number of the MAC clients. In the systems at the two ends of a link, the number of frame distributors and the number of frame collectors may not be directly related to the number of physical links in the LAG or the number of the VLANs of a certain physical link.

When one LAG corresponds to a plurality of MAC clients, each frame distributor at the transmitting end corresponds to a VLAN, and one frame distributor corresponds to one MAC client. That is, one end of the frame distributor is only connected to one MAC client, and the other end of the frame distributor is only connected to the link having a certain VLAN in the LAG. After receiving the MAC frames transmitted from the MAC client, the frame distributor extracts the information such as the DA, SA, M_SDU, and service_class from the MAC frames. Then, the frame distributor uses predetermined frame distribution algorithm to transmit the received MAC frames to the corresponding link according to the extracted information so as to transmit the MAC frames to the receiving end. An aggregator parser/multiplexer processes the MAC according to the VLAN identifiers of the MAC frames after the receiving end receives the MAC frames. If the VLAN identifiers of the MAC frames received by the aggregator parser/multiplexer do not belong to the link for transmitting the MAC frames, the aggregator parser/multiplexer discards the received MAC frames, and performs other relevant processes. Furthermore, if the VLAN identifiers of the MAC frames received by the aggregator parser/multiplexer belong to the link for transmitting the MAC frames, the aggregator parser/multiplexer transmits the received MAC frames to the frame collector corresponding to the VLAN identifiers of the link for transmitting the MAC, and the frame collector transmits the received MAC frames to the MAC client corresponding to the frame collector.

When one LAG corresponds to a plurality of MAC clients, each frame distributor will only receive the MAC frames transmitted by the corresponding MAC client. The frame distributor will only receive the MAC frames transmitted by the corresponding MAC client with various methods. For example, according to the corresponding VLAN of the MAC client, one frame distributor is only connected to one MAC client, or the transmitting end firstly obtains the VLAN information of the MAC frames transmitted by the MAC client, and then, according to the VLAN information and the VLAN information corresponding to the frame distributor, the MAC frames are distributed to the corresponding frame distributor. Each frame distributor only distributes the MAC frames to the associated link, and each frame collector only receives the MAC frames from the associated link. That is, in the direction of MAC frames leaving the system, the distribution of MAC frames is firstly performed on the MAC clients of different VLANs, and this distribution process may be realized by connecting the MAC clients to the corresponding frame distributors, or according to the VLAN information of the MAC frames and the VLAN information corresponding to the frame distributors. Through the MAC frame distribution which is firstly performed, the MAC frames at the MAC client may be directly distributed to the corresponding frame distributor. Then, the frame distributor distributes the MAC frames to the links of the VLANs of the MAC frames. In the direction of the MAC frames entering the system, for a certain port, the MAC frames are firstly distributed to the frame collector corresponding to the VLAN of the link, and then the frame collector collects the MAC frames of the VLAN transmitted from a plurality of ports. Then, the collector transmits the MAC frames to the corresponding MAC client.

In the above description, the frame distributor and the frame collector are associated with links in the LAG, and in the association process, the following three conditions may occur.

A. When an intersection set exists between the VLANs of the two ends of a link, the link has its own VLAN, and under this circumstance, the link is associated with the frame distributor and the frame collector having the same VLAN.

B. When an intersection set does not exist between the VLANs of the two ends of a link, the link does not have its own VLAN, and under this circumstance, the link is associated with no frame distributor and frame collector.

C. The VLAN of a certain MAC client is not in the intersection set of the VLANs at the two ends of the link, and under this circumstance, the frame distributor and the frame collector of the MAC client are not associated with any link.

In the circumstances B and C, the MAC frames may be transceived according to the MAC frame transceiving method in the conventional technology.

When the VLANs of the link change, the variation may not influence the operation of distributing MAC frames by the frame distributor in a period of time, that is, the MAC frames distributed by the frame distributor in a period of time may lose. When the VLANs of the link change, the frame distributor may stop the distribution of the MAC frames temporarily, and after the VLAN of the link is redetermined, the frame distributor continues the distribution of the subsequent MAC frames.

A system for transceiving MAC frames according to an embodiment of the present invention is described as follows.

The system for transceiving MAC frames according to the embodiment of the present invention mainly includes a transmitting device and a receiving device.

The transmitting device obtains VLAN information of MAC frames transmitted by an MAC client, searches for an LAG corresponding to the MAC client, and obtains the VLAN information of the link in the LAG corresponding to the MAC client. The transmitting device searches for and selects the links having the same VLAN as the MAC frames according to the VLAN information of the link, and selects the link for sending the MAC frames from the links having the same VLAN as the MAC frames, and then the MAC frames are transmitted to the receiving end through the above selected link.

In the above description, the transmitting device may obtain the information such as the DA, SA, M_SDU, and service_class from the MAC frames according to the actual requirements for transmitting the MAC frames. Thus, the transmitting device may adopt a predetermined frame distribution algorithm to distribute the MAC frames to the links having the same VLAN as the MAC frames according to information such as the DA, SA, VLAN information, M_SDU, and service_class, so that the MAC frames may be transmitted to the receiving end through the correct VLAN link. The transmitting device ensures that the MAC frames belonging to a certain VLAN can be distributed to only the link of this VLAN.

After the receiving end receives the MAC frames from a link of the LAG, the receiving device transmits the MAC frames to the MAC client corresponding to the LAG.

When one LAG corresponds to one MAC client, the transmitting device includes a frame distributor, and the receiving device includes a frame collector. When one LAG corresponds to a plurality of MAC clients, the transmitting device includes a plurality of frame distributors, and the receiving device includes a plurality of frame collectors. The receiving device may further include an aggregator parser/multiplexer to filter the MAC frames transmitted from the transmitting device. The process for transceiving the MAC frames by the frame distributor and the frame collector and the process for transceiving the MAC frames by the plurality of frame distributors and the plurality of frame collectors have been described in the previous method embodiments. The process for processing the MAC frames by the aggregator parser/multiplexer in the receiving device has been described in the previous method embodiments.

Figure 5:
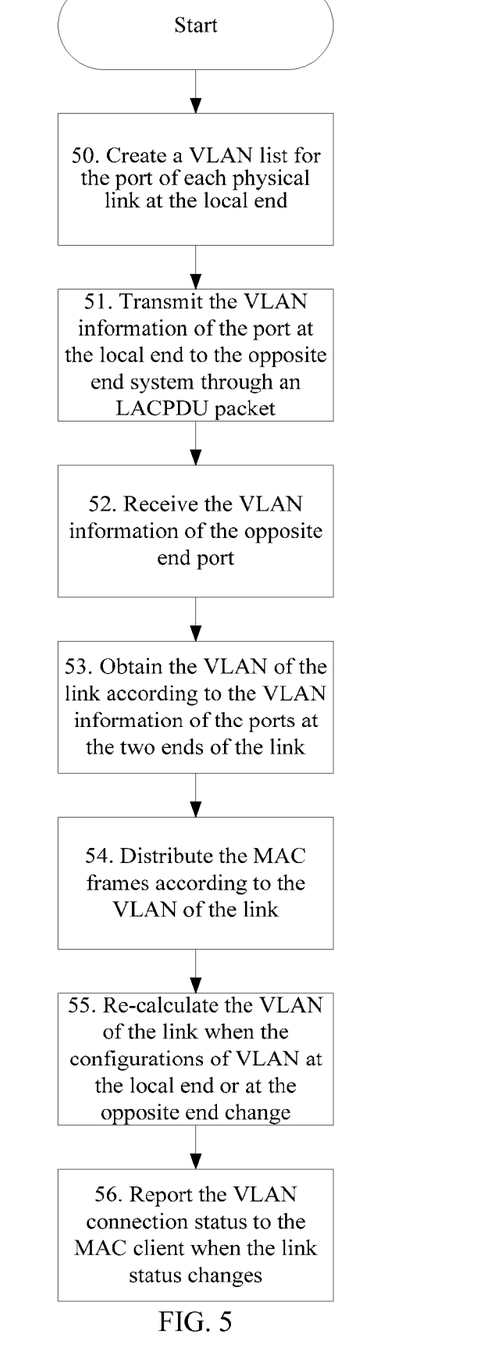
FIG. 5 is a flow chart of link aggregation based on the VLAN of a port according to an embodiment of the present invention.

When the LAG in the process of distributing the MAC frames is the LAG based on the VLAN according to the embodiments of the present invention, the link aggregation and the MAC frames are distributed as shown in FIG. 5.

Referring to FIG. 5, in Step 50, the systems at the two ends of a physical link create a VLAN list for the ports of the link respectively so as to store the information of the VLANs of the port of the link.

In Step 51, the systems at the two ends of the link both carry the VLAN information of the link at the port in the local end system in an LACPDU packet and transmit it to the opposite end system.

In Step 52, the systems at the two ends of the link receive and store the information of the VLAN of the port transmitted from the opposite end system. The systems may store the received information of the VLAN of the port in the VLAN list.

In Step 53, the systems at the two ends of the link intersect the VLAN information of the port of the link in the local end system and the VLAN information of the port in the opposite end system, and determine the VLANs in the intersection set as the VLANs of the link.

In Step 54, the systems at the two ends of the link distribute MAC frames according to the VLANs of the link and the VLAN information in the MAC frames.

When the VLANs configured at the ports of the two ends of the link change, Step 55 is performed, the system at the end where the change occurs transmits the information of the VLAN of the port in the local end system to the opposite end system, and the systems at the two ends of the link both update the information of the VLANs of the port stored therein in time, and re-calculate the VLAN of the link according to the information of the VLANs of the port.

When the link status of a certain physical link changes, Step 56 is performed, the systems at the two ends of the link both perform operations such as sending an LAG connection fault report or acquiring an LAG connection recovery report.

It will be apparent to those skilled in the art that various modifications and variations can be made to the structure of the present invention without departing from the scope of the invention. In view of the foregoing, it is intended that the present invention cover modifications and variations of the present invention provided they fall within the scope of the following claims and their equivalents.

What is claimed is:

1. A method for aggregating links into a link aggregation group (LAG) for a Media Access Control (MAC) frame transmission, comprising:
   receiving, by a first system at a local end of a link, first information about a plurality of first virtual local area networks (VLANs), to which a first port that is connected to the link belongs, from a second system at a peer end of the link;
   determining, by the first system, a VLAN to which the link belongs, according to the received first information about the first VLANs and second information about a plurality of second VLANs to which a second port of the first system belongs, wherein the second port is connected to the link; and
   performing, by the first system, link aggregations according to the determined VLAN;
   wherein determining the VLAN by the first system further comprises:
   comparing the plurality of the first VLANs received with the plurality of the second VLANs to obtain an intersection set, and determining the VLAN(s) in the intersection set as the determined VLAN to which the link belongs.

2. The method according to claim 1, further comprising:
   outputting connection fault information of the LAG, if all the links in the LAG are faulty; and outputting connection recovery information of the LAG if at least one of the links in the LAG returns to a normal status after the correction fault information is output.

3. The method according to claim 1, wherein receiving, by the first system at the local end of the link, the first information about the plurality of the first virtual local area networks (VLANs) to which the first port that is connected to the link belongs, from the second system at the peer end of the link comprises:
   receiving, by the first system, an updated first VLAN list to which the first port that is connected to the link belongs, from the second system, wherein the updated first VLAN list comprises the first information of the plurality of the first VLANs to which the first port that is connected to the link belongs.

4. The method according to claim 1, wherein the first information is received through a packet based on one protocol of the group consisting of: (a) a link aggregation control protocol and (b) a generic attribute registration protocol VLAN registration protocol (GVRP).

5. A device for carrying out link aggregations, disposed in an end system of a link, the device comprising:
   a transceiver module, configured to receive first information of a plurality of first virtual local area networks (VLANs) to which a first port that is connected to the link belongs, from a system at a peer end of the link; and
   a link aggregation module, configured to determine a VLAN to which the link belongs, according to the information of the first VLANs and information of a plurality of second VLANs, to which the port of the device that is connected to the link belongs, and perform the link aggregations according to the determined VLAN to which the link belongs;
   the link aggregation module is further configured to compare the plurality of the first VLANs received with the plurality of the second VLANs to obtain an intersection set and determine the VLAN(s) in the intersection set as the determined VLAN to which the link belongs.

6. The device according to claim 5, wherein the transceiver module, further configured to transmit to the system at the peer end of the link, the information of the plurality of the second VLANs to which the port of the device that is connected to the link belongs.

* * * * *